F. MORETON.
MAGNETIC VALVE.
APPLICATION FILED MAR. 2, 1918. RENEWED JAN. 29, 1920.
1,342,641.                                   Patented June 8, 1920.
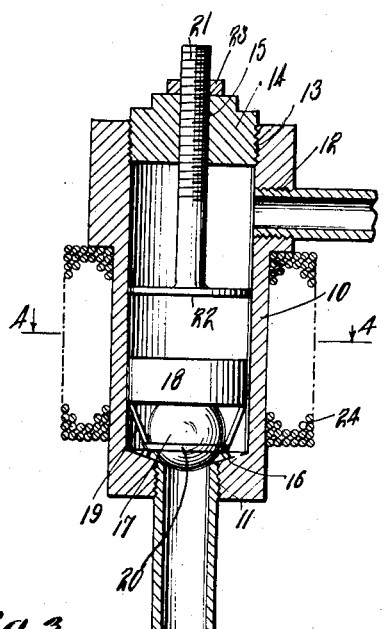
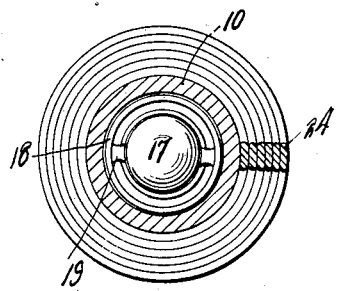
WITNESSES
INVENTOR
Frank Moreton
ATTORNEY

UNITED STATES PATENT OFFICE.

FRANK MORETON, OF WILMINGTON, DELAWARE.

MAGNETIC VALVE.

1,342,641.  Specification of Letters Patent.  Patented June 8, 1920.

Application filed March 2, 1918, Serial No. 220,052. Renewed January 29, 1920. Serial No. 354,880.

*To all whom it may concern:*

Be it known that I, FRANK MORETON, a citizen of the United States, residing at Wilmington, in the county of New Castle, and State of Delaware, have invented certain new and useful Improvements in Magnetic Valves, of which the following is a specification.

This invention has relation to magnetically operable valves, and has for an object to provide a valve of this type embodying a spherical valve loosely mounted, and for engagement upon a valve seat, with magnetic means for dislodging the valve to permit the passage of fluid therethrough.

Another object of the invention is to provide a magnetically operable valve of the character above set forth embodying a spherical valve formed of non-magnetic material, and a core associated with the valve and movable when the magnetic means is energized to dislodge the valve from its seat.

In addition to the foregoing my invention comprehends improvements in the details of construction and arrangements of the parts to be hereinafter more fully described, and particularly set forth in the appended claim.

In the accompanying drawings in which similar and corresponding parts are designated by the same characters of reference throughout the several views in which they appear:

Figure 1, is a view in vertical section on an enlarged scale illustrating one form of my magnetic valve and the details thereof.

Fig. 2, is a transverse section taken on line 4—4 of the immediately preceding figure.

Fig. 3 is a top plan view of the spider used in connection with the present invention.

Referring to the drawing 10 indicates a valve casing having an internally threaded outlet opening 11 at one end, and a lateral inlet opening 12 at its opposite end similarly threaded. The end of the casing adjacent the inlet opening 12 is open and internally threaded as at 13 to receive a cap 14 formed with a central, internally threaded opening 15.

The end of the valve casing adjacent the opening 11 is beveled to form a valve seat 16 to accommodate a spherical valve 17, which is of non-magnetic material, such as rubber, composition or the like. Movable within the valve casing and closely fitting the sides thereof is a core 18 in the form of an annular member having a pair of converging arms 19 formed in one end to the extremities of which there is secured, or formed integrally if desired, an annular member 20 which embraces the valve and is of a diameter slightly less than the diameter of the valve to prevent the valve from falling therethrough. The core 18 is formed of magnetic material, while the valve casing 10 is formed of non-magnetic material for a purpose which will be presently noted. Threadedly engaged in the opening 15 of the cap 14 is a rod 21 having upon the end interiorly of the casing a spider or the like 22 to snugly fit the inner walls of the valve casing whereby said spider may be adjusted toward or away from the core 18. To secure the rod 21 against movement subsequent to adjustment, a jam nut 23 is threaded thereon to engage the cap 14.

Surrounding the valve casing is a solenoid 24 of a relatively large number of turns of wire.

The valve is used in an upright position so that the valve member 17 may be retained by gravity upon its seat at which time the core 18 is located adjacent the lower end of the solenoid 24. When said solenoid is energized the core 18 is lifted toward a mid position thereby dislodging the valve 17 from its seat and carrying the same upward. Owing to the open construction of the spider 22, the core 18 and appurtenant parts thereof, the fluid is permitted to pass through the valve casing between the openings 11 and 12. By adjusting the rod 21 toward and away from the core it will be obvious that the movement of the valve will be thus limited.

Having thus described my invention what I claim as new and desire to secure by Letters Patent is:—

In a valve, a casing having a cylindrical bore and a valve seat in one end thereof, an annular core fitting the bore of the casing for movement therein, a spherical valve of non-magnetic material, a connection between the core and the valve, a rod threadedly engaged in the valve casing, and having a spider at one end disposed in the bore of the casing and adapted to limit movement of the core, and a solenoid embracing the casing and adapted to actuate said core.

In testimony whereof I affix my signature in presence of two witnesses.

FRANK MORETON.

Witnesses:
HARRY B. STRADLEY,
ALFRED WHARTENBY.